United States Patent
Fartmann et al.

(10) Patent No.: US 8,325,709 B2
(45) Date of Patent: Dec. 4, 2012

(54) METHOD AND TERMINAL FOR CONTROLLING MULTIMEDIA CONNECTIONS

(75) Inventors: Alfons Fartmann, Garching (DE); Klaus Wille, München (DE)

(73) Assignee: Siemens Enterprise Communications GmbH & Co. KG, Munich (DE)

(*) Notice: Subject to any disclaimer, the term of this patent is extended or adjusted under 35 U.S.C. 154(b) by 1154 days.

(21) Appl. No.: 11/662,677

(22) PCT Filed: Aug. 31, 2005

(86) PCT No.: PCT/EP2005/054287
§ 371 (c)(1),
(2), (4) Date: Mar. 13, 2007

(87) PCT Pub. No.: WO2006/034938
PCT Pub. Date: Apr. 6, 2006

(65) Prior Publication Data
US 2007/0274347 A1   Nov. 29, 2007

(30) Foreign Application Priority Data
Sep. 30, 2004  (DE) .................. 10 2004 047 743

(51) Int. Cl.
*H04L 12/66* (2006.01)
*H04L 12/28* (2006.01)
*G06F 15/16* (2006.01)

(52) U.S. Cl. .............. 370/352; 370/395.2; 709/227; 709/228; 709/229

(58) Field of Classification Search ............ 370/252, 370/395.2; 709/227, 228, 229
See application file for complete search history.

(56) References Cited

U.S. PATENT DOCUMENTS
6,438,599 B1   8/2002 Chack
(Continued)

FOREIGN PATENT DOCUMENTS
EP   0 999 712 A2   5/2000
(Continued)

OTHER PUBLICATIONS

ITU-T—Infrastructure of audiovisual services—Systems and terminal equipment for audiovisual services—H.323—"Packet-based multimedia communications systems", Published: 1999.*
(Continued)

*Primary Examiner* — Ayaz Sheikh
*Assistant Examiner* — Tarell Hampton

(57) ABSTRACT

In one aspect, multimedia connections are enabled between terminals coupled to a first communication network with a power characteristic control system and to a second communication network for transmitting multimedia data to be controlled in a simple manner. When a switching-oriented power characteristic is activated, the power characteristic control system controls a base connection by means of the first communication network between a first terminal and a second terminal. In the framework of the base connection, address information identifying the first terminal in the second communication network and multimedia information are transmitted to the second terminal. Furthermore, according to a multimedia capacity of the second terminal, the transmitted multimedia information, and the control system of the base connection, a terminal-controlled multimedia connection is controlled by means of the second communication network between the first and the second terminal, on the basis of the transmitted address information.

10 Claims, 1 Drawing Sheet

U.S. PATENT DOCUMENTS

| | | | |
|---|---|---|---|
| 7,058,008 B1* | 6/2006 | Wilson et al. | 370/216 |
| 2002/0013812 A1* | 1/2002 | Krueger et al. | 709/203 |
| 2003/0072429 A1 | 4/2003 | Slobodin et al. | |
| 2003/0088619 A1 | 5/2003 | Boundy | |
| 2004/0205199 A1* | 10/2004 | Gormish | 709/229 |
| 2005/0083941 A1* | 4/2005 | Florkey et al. | 370/395.2 |
| 2005/0089018 A1* | 4/2005 | Schessel | 370/352 |
| 2005/0108328 A1* | 5/2005 | Berkeland et al. | 709/204 |
| 2005/0157704 A1* | 7/2005 | Lim | 370/352 |
| 2006/0288373 A1* | 12/2006 | Grimes et al. | 725/62 |

FOREIGN PATENT DOCUMENTS

| | | |
|---|---|---|
| WO | WO 02/052825 A1 | 7/2002 |

OTHER PUBLICATIONS

J. Rosenberg, H. Schulzrinne, G. Camarillo, A. Johnston, J. Peterson, R. Sparks, M. Handley, E. Schooler, Conference: Signal and Image Processing, RFC 3261—SIP , 2002, pp. 1-18, 77-85.*

James Toga, Jörg Ott; "ITU-T standardization activities for interactive multimedia communications on packet-based networks: H.323 and related recommendations"; Computer Networks, Feb. 11, 1999, pp. 205-223; vol. 31, No. 3.; XP004304599, ISSN: 1389-1286, Elsevier Science Publishers B.V., Amsterdam, NL.

* cited by examiner

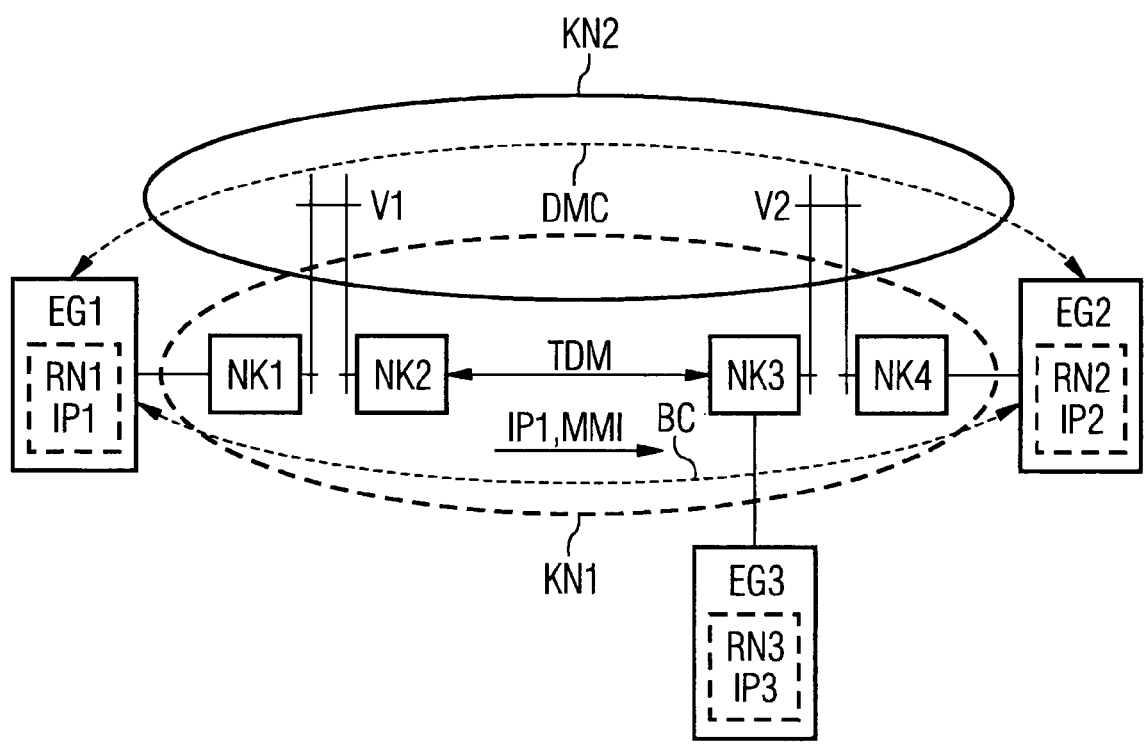

METHOD AND TERMINAL FOR CONTROLLING MULTIMEDIA CONNECTIONS

CROSS REFERENCE TO RELATED APPLICATIONS

This application is the US National Stage of International Application No. PCT/EP2005/054287, filed Aug. 31, 2005 and claims the benefit thereof. The International Application claims the benefits of German application No. 102004047743.4 DE filed Sep. 30, 2004, both of the applications are incorporated by reference herein in their entirety.

FIELD OF INVENTION

The present invention relates to a method and terminal for controlling multimedia connections.

BACKGROUND OF INVENTION

Numerous call processing features such as, for instance, consultation, toggle, transfer, etc. that are controlled by network nodes or switching equipment involved in a respective connection are available in modern telephone networks for connected terminals. Telephone networks of said type are frequently composed in a heterogeneous manner of subnetworks and/or network sections that differ with respect to the types of trunk circuits they employ. To cite instances, for example analog telephone lines, ISDN-based TDM lines (TDM: Time Division Multiplexing), or internet-protocol-based LAN or WAN connections (LAN: Local Area Network; WAN: Wide Area Network) can be provided as trunk circuits.

As well as for voice communication, a communication network of said type can as a rule be employed also for further user information services, for example fax or data services. The user information therein requiring to be transmitted must in heterogeneous telephone networks be converted for each network section involved in a connection into a form of transmission corresponding to the respective type of trunk circuit employed by said network section, for example into analog or TDM signals or internet protocol data packets, and be switched in the network sections' switching equipment involved.

SUMMARY OF INVENTION

It frequently happens, though, particularly in the case of data-intensive user information services such as, for instance, multimedia services and especially video services, that at least one network section involved in the transmission, for example an analog or TDM section, or a switching device, for example a 64-kbit switching network, will not allow suitable converting or, as the case may be, switching. User information services of said type cannot readily be used in a communication network of such kind.

For supporting multimedia services it can, according to the known prior art, be provided for existing voice communication networks to be expanded in all network sections, all switching equipment, and all feature controlling means in keeping with the transmission requirements of the multimedia services. That, though, entails a substantial expense in many cases, and especially where public communication networks are concerned.

An additional communication network that supports multimedia services such as, for example, video services, can alternatively be implemented alongside an existing, non-multimedia-enabled communication network, for example a telephone network. The features provided by the existing communication network will not, though, be readily available in an additional communication network of said kind.

An object of the present invention is to disclose a method for controlling multimedia connections that allows features to be controlled simply. The object of the invention is further to disclose a terminal for implementing the method.

Said object is achieved by a method and by a terminal.

Multimedia connections, for example connections for transmitting video and/or application data, between terminals coupled to a first communication network having a feature controlling means and to a second communication network for transmitting multimedia data, can be controlled in a simple manner by means of the invention.

The first communication network can therein be implemented by means of, for example, an at least partially circuit-switched communication network having analog or TDM transmission links. The second communication network can be, for example, a packet-switched, preferably internet-protocol-based communication network, in particular a LAN, WAN, or the internet.

It is provided for the feature controlling means to control a basic connection between a first terminal and a second terminal via the first communication network upon activation of a call processing feature such as, for instance, connection setup, consultation, toggle, or transfer. Controlling of said type is to be understood in particular as a setting-up or clearing-down of the basic connection, and any other form of controlling it. According to the invention, address information identifying the first terminal in the second communication network, for example an internet protocol address, as well as multimedia information is conveyed to the second terminal within the scope of the basic connection. A terminal-controlled multimedia connection between the first and second terminal via the second communication network is then controlled—preferably by the second terminal—as a function of a multimedia enabling of the second terminal and as a function of the multimedia information conveyed and of controlling of the basic connection, using the address information conveyed. Controlling of said type is also to be understood in particular as a setting-up or clearing-down of the multimedia connection, and any other form of controlling it.

By means of the invention, call processing features of the first communication network can be used in a simple manner for multimedia connections. To cite an instance, by activating features in the first communication network within the scope of which features basic connections between terminals are set up or cleared down, multimedia connections between said terminals can be automatically set up or, as the case may be, cleared down in parallel via the second communication network. Multimedia connections in the second communication network can in this way to an extent be indirectly controlled by features available in the first communication network.

A further advantage of the invention can be seen in that only slight modifications to the terminals involved are required for its implementation.

Advantageous embodiments and developments of the invention are described in the dependent claims.

According to an advantageous embodiment of the invention it can be provided for a setting-up of a basic connection by the feature controlling means to effect a setting-up of the multimedia connection—preferably by the second terminal—, and for the basic connection to remain established after the multimedia connection has been set up for activating further features.

The first and second communication network can furthermore be accessed by the first or second terminal as logically different communication networks, although both communication networks can have common transmission links or sublinks.

A multimedia enabling of the first terminal, requesting of a quality-of-service for the multimedia connection, a multimedia type of the multimedia connection and/or multimedia enabling, necessary for the multimedia connection, of the second terminal can preferably be specified by means of the multimedia information. The second terminal can thus decide through comparing its own multimedia enabling with the received multimedia information whether and, where applicable, with what options the multimedia connection is to be set up.

According to an advantageous development of the invention it can, if the multimedia connection is set up, be provided for user information requiring to be transmitted to be transmitted via said multimedia connection and, if the multimedia connection is not set up or is cleared down, for the user information to be reduced and the reduced user information to be transmitted via the basic connection. At least a reduced communication connection between the terminals involved can in this way be used if a suitable multimedia connection is unavailable.

BRIEF DESCRIPTION OF THE DRAWINGS

An exemplary embodiment of the invention is explained in more detail below with reference to the sole drawing.

The FIGURE is a schematic of a communication system having terminals coupled in each case via two communication networks.

DETAILED DESCRIPTION OF INVENTION

The FIGURE is a schematic of a communication system in which multimedia-enabled, for example video-enabled terminals EG1, EG2, and EG3 are in each case coupled to a communication network KN1 and to a communication network KN2. In the present exemplary embodiment the communication network KN2 is implemented by means of a packet-switched, preferably internet-protocol-based communication network, for example a LAN, WAN, or the internet, which supports transmitting multimedia data as user information as part of a pre-specified multimedia service. In the present exemplary embodiment the communication network KN1 is a heterogeneous communication network, for example a combination of private and public communication networks, having packet-switched network sections and circuit-switched network sections. The communication network KN1 includes network nodes NK1, NK2, NK3, and NK4 as switching equipment for switching connections between terminals, in this case EG1, EG2, and EG3, connected to the communication network KN1. A feature controlling means for controlling features available in the communication network KN1 such as, for instance, consultation, toggle, and/or transfer, is furthermore implemented by the network nodes NK1, . . . , NK4. In the present exemplary embodiment the terminal EG1 is coupled to the network node NK1, the terminal EG2 is coupled to the network node NK4, and the terminal EG3 is coupled to the network node NK3.

The network node NK1 is coupled via a packet-switched network section V1 crossing via the communication network KN2 to the network node NK2, which is in turn coupled via a circuit-switched, ISDN-based TDM transmission link TDM, for example a public ISDN telephone network, to the network node NK3. Finally, the network node NK3 is coupled to the network node NK4 by means of a packet-switched network section V2 crossing via the communication network KN2. Despite their common network sections V1 and V2, the communication networks KN1 and KN2 are accessed by the terminals EG1, EG2, and EG3 and the network nodes NK1, . . . , NK4 as logically separate communication networks. When user information is transmitted via the communication network KN1, said information is converted in keeping with a respective type of transmission line of the individual network sections V1, TDM, and V2 by the respective interworking nodes at the interworking points between said individual sections into a respectively suitable transmission form, in this case TDM signals or, as the case may be, internet protocol data packets.

In the present exemplary embodiment the TDM transmission link does not allow multimedia data to be transmitted at a quality-of-service necessary for the pre-specified multimedia service. The transmission path between the terminals EG1 and EG3 or EG2 via the communication network KN1 is for that reason non-multimedia-enabled in terms of said multimedia service.

The terminal EG1 is assigned a directory number RN1 and an internet protocol address IP1. The terminal EG2 is correspondingly assigned a directory number RN2 and an internet protocol address IP2, and the terminal EG3 a directory number RN3 and an internet protocol address IP3. The terminals EG1, EG2, and EG3 are identified in each case in the communication network KN1 by means of the directory numbers RN1, RN2, and RN3 assigned to them and in each case in the communication network KN2 by the internet protocol addresses IP1, IP2, and IP3 respectively assigned to them.

For setting up a multimedia connection from the terminal EG1 to the terminal EG2, a voice connection is inventively set up as a basic connection BC from the terminal EG1 via the non-multimedia-enabled communication network KN1 to the terminal EG2 using the directory number RN2 of the destination terminal EG2. Setting-up of the basic connection BC as well as features supporting setting-up of the basic connection are herein controlled by the network nodes NK1, NK2, NK3, and NK4 involved in the connection setup. The basic connection BC illustrated in the FIGURE by means of a dashed line having an arrow at each end includes both the packet-switched network sections V1 and V2 and the circuit-switched network section TDM.

Within the scope of the basic connection BC the internet protocol address IP1 of the calling terminal EG1 and multimedia information MMI are transmitted to the called terminal EG2. The multimedia information MMI therein indicates a multimedia enabling, for example video enabling of the terminal EG1. The terminal EG2 then compares the received multimedia information MMI with an own multimedia enabling. If the terminal EG2 therein recognizes that EG1 and EG2 both fulfill the requirements of the pre-specified multimedia service, a direct terminal-controlled multimedia connection DMC will be set up between the terminals EG2 and EG1 via the communication network KN2 by the terminal EG2 using the received internet protocol address IP1. The multimedia connection DMC is implemented preferably as what is termed a DMC connection (DMC: Direct Media Connection). While setting-up of the multimedia connection DMC is controlled by the terminal EG2, the established multimedia connection DMC can be cleared down again, or controlled in another way, by both terminals EG1 and EG2 involved.

When the multimedia connection DMC has been set up, multimedia user information, for example video data, requiring to be transmitted as part of the multimedia service is transmitted directly between the terminals EG1 and EG2 via the multimedia connection DMC. Preferably no or relatively only little user information will be transmitted via the still existing basic connection BC while the multimedia connection DMC exists. If the multimedia connection DMC is cleared down while the basic connection BC still exists, the multimedia user information can be reduced and the reduced user information, for example only voice information, can be transmitted via the basic connection BC.

When the terminal-controlled multimedia connection DMC has been set up, the basic connection BC will continue to exist in parallel with the multimedia connection DMC. That allows further features controlled by the network nodes NK1, . . . , NK4 involved in the basic connection BC to be activated in a simple manner.

By means of the invention, the call processing features of the communication network KN1 can advantageously be used for controlling multimedia connections via the communication network KN2. An act of activating the consultation feature at the terminal EG1 is considered below as an instance of such a use of a call processing feature. It is therein assumed that, with both a basic connection BC and a multimedia connection DMC existing, a consultation is activated at the terminal EG1 to the terminal EG3 by entering its directory number RN3. The basic connection BC will as a result of said activating first be cleared down by the feature controlling means of the communication network KN1, which is to say by the network nodes NK1, NK2, NK3, and NK4 involved, which action will inventively cause the parallel multimedia connection DMC likewise to be cleared down by the first or second terminal. A new basic connection (not shown) will then, as part of the consultation feature, be set up between the terminals EG1 and EG3 via the communication network KN1 by said network's feature controlling means. The internet protocol address IP1 identifying the terminal EG1 and the multimedia information MMI will, within the scope of said new basic connection, be transmitted by the terminal EG1— as in the case of the preceding setup of the basic connection BC—to the terminal EG3. A new terminal-controlled multimedia connection (not shown) will then inventively be set up by the terminal EG3, after a comparison of its own multimedia enabling with the received multimedia information, to the terminal EG1 via the communication network KN2 using the received internet protocol address IP1. The terminals EG1 and EG3 will then be able to exchange multimedia user information via the new multimedia connection that has been set up.

The feature controlling means of the communication network KN1 will in this way, through said means' setting up of the new basic connection via the communication network KN1 (or, as the case may be, through clearing down of the basic connection BC), induce parallel setting up of the multimedia connection via the communication network KN2 (or, as the case may be, clearing down of the multimedia connection DMC). An act of activating any feature within whose scope a basic connection is set up or cleared down between terminals of the communication network KN1 will in general result in a corresponding setting-up or, as the case may be, clearing-down of a multimedia connection via the communication network KN2. Multimedia connections via the communication network KN2, that does not itself have a corresponding feature controlling means, can in this way be controlled to an extent indirectly by the feature controlling means of the communication network KN1. Numerous call processing features of the communication network KN1 can hence also be used within the scope of multimedia connections via the communication network KN2.

Upon activation of a feature within whose scope for example only voice, tones, announcements, or other user information for which a multimedia connection is not required or desired are transmitted via the communication network KN1, or if non-multimedia-enabled terminals are to be connected, a possibly existing multimedia connection will be cleared down again by one of the terminals involved and the user information then transmitted via the basic connection BC.

The invention claimed is:

1. A method for controlling a multimedia connection between a first terminal and a second terminal coupled to a first communication network having a controller of a call processing feature and to a second communication network for transmitting multimedia data, comprising:

establishing by the controller of the call processing feature a basic connection between the first and the second terminals via the first communication network in response to an activation of the call processing feature;

conveying address information identifying the first terminal in the second communication network and conveying multimedia information to the second terminal via the basic connection, the multimedia information identifying a multimedia enablement of the first terminal;

determining by the second terminal if the first and second terminals are capable of handling a multimedia feature via the conveyed multimedia information;

in response to determining that the first and second terminals are capable of supporting the multimedia feature:
setting up by the second terminal the multimedia connection between the first and second terminals via the second communication network using the conveyed address of the first terminal relating to the second communication network and the conveyed multimedia information, the second terminal controlling the setting up of the multimedia connection and transmitting multimedia data over the multimedia connection; and wherein the multimedia information of the first terminal is provided to the second terminal such that the second terminal receives multimedia enablement information of the first terminal and the first terminal does not receive multimedia enablement information of the second terminal for the setting up of the multimedia connection.

2. The method as claimed in claim 1 wherein the establishment of the basic connection by the controller of the call processing feature effects a setting-up of the multimedia connection, and the basic connection remains established after the multimedia connection has been set up for an activation of an additional call processing feature.

3. The method as claimed in claim 1 wherein the first communication network and the second communication network have common transmission links and are accessed by the first or second terminal as logically different communication networks.

4. The method as claimed in claim 1 wherein a multimedia enabling of the first terminal, requesting of a quality-of-service for the multimedia connection, a multimedia type of the multimedia connection or multimedia enabling necessary for the multimedia connection is specified via multimedia information conveyed to the second terminal prior to the setting-up by the second terminal of the multimedia connection between the first and second terminals.

5. The method as claimed in claim 1 further comprising
in response to determining the first and second terminals are incapable of supporting the multimedia feature:

reducing the multimedia data, and transmitting the reduced data via the basic connection.

6. The method as claimed in claim 4 wherein multimedia data is transmitted via the multimedia connection when the multimedia connection is set up, and wherein the multimedia data is reduced and the reduced data is transmitted via the basic connection when the multimedia connection is cleared down.

7. The method as claimed in claim 1 wherein the address information identifying the first terminal in the second communication network is comprised of an internet protocol address.

8. The method as claimed in claim 7, wherein the first communication network and the second communication network have common transmission links and are accessed by the first or second terminal as logically different communication networks.

9. The method as claimed in claim 1 wherein the address information of the first terminal is comprised of an address relating to the first network that is a directory number and an address relating to the second network that is an internet protocol address.

10. The method of claim 1 wherein the multimedia connection between the first terminal and the second terminal is a direct terminal-controlled multimedia connection.

* * * * *